United States Patent
Hirshberg et al.

(10) Patent No.: US 10,947,685 B1
(45) Date of Patent: Mar. 16, 2021

(54) OBJECT-GATHERING APPARATUS

(71) Applicant: Jay Hirshberg, Fort Myers, FL (US)

(72) Inventors: Jay Hirshberg, Fort Myers, FL (US);
Casey Cotter, Frenchtown, MT (US)

(73) Assignee: Jay Hirshberg, Fort Myers, FL (US)

( * ) Notice: Subject to any disclaimer, the term of this patent is extended or adjusted under 35 U.S.C. 154(b) by 0 days.

(21) Appl. No.: 17/017,348

(22) Filed: Sep. 10, 2020

(51) Int. Cl.
*A47L 11/24* (2006.01)
*E01H 1/04* (2006.01)
*A01G 20/43* (2018.01)
*A47L 11/40* (2006.01)
*E01H 1/05* (2006.01)

(52) U.S. Cl.
CPC ............. *E01H 1/045* (2013.01); *A01G 20/43* (2018.02); *A47L 11/24* (2013.01); *A47L 11/4013* (2013.01); *A47L 11/4041* (2013.01); *A47L 11/4069* (2013.01); *A47L 11/4027* (2013.01); *A47L 11/4063* (2013.01); *A47L 2201/04* (2013.01); *E01H 1/056* (2013.01)

(58) Field of Classification Search
CPC ...... A47L 9/009; A47L 9/2805; A47L 9/2852; A47L 11/24; A47L 11/4013; A47L 13/12; A47L 13/51; A47L 11/4069; A47L 11/4041; A47L 11/4027; A47L 11/4063; A47L 11/4066; A46B 5/0095; A01D 34/84; A01G 20/43
USPC ............................. 15/1.7, 21.1, 319; 701/23
See application file for complete search history.

(56) References Cited

U.S. PATENT DOCUMENTS

| | | | |
|---|---|---|---|
| 1,830,443 A * | 11/1931 | Owen | A47L 11/4041 15/41.1 |
| 5,933,900 A * | 8/1999 | Wang | A47L 11/03 15/50.3 |
| 7,281,296 B2 | 10/2007 | Strauser | |
| 7,636,982 B2 | 12/2009 | Jones et al. | |
| 8,452,450 B2 | 5/2013 | Dooley et al. | |
| 8,567,003 B2 * | 10/2013 | McLeod | A47L 9/327 15/319 |
| 8,961,695 B2 | 2/2015 | Romanov et al. | |
| 10,470,629 B2 | 11/2019 | Ziegler et al. | |
| 2003/0204931 A1 | 11/2003 | Kim | |
| 2012/0317744 A1* | 12/2012 | Gilbert, Jr. | A47L 11/4041 15/319 |
| 2014/0289992 A1 | 10/2014 | Ziegler et al. | |
| 2016/0095487 A1 | 4/2016 | Koura et al. | |

(Continued)

FOREIGN PATENT DOCUMENTS

| | | |
|---|---|---|
| CN | 110226898 A | 9/2019 |
| DE | 202018001696 U1 | 6/2018 |
| WO | 2011115536 A1 | 9/2011 |

*Primary Examiner* — Mark Spisich
*Assistant Examiner* — Katina N. Henson
(74) *Attorney, Agent, or Firm* — Armstrong Teasdale LLP

(57) ABSTRACT

A self-propelled object-gathering apparatus includes a chassis, a drive system coupled to the chassis and configured to traverse the apparatus over a surface, and a control system coupled to the chassis. The control system is programmed to detect a bounded operational area, and to guide the apparatus within the bounded operational area. The apparatus also includes a receptacle coupled to the chassis, and a sweep assembly coupled to the chassis and rotatable with respect to the chassis. The sweep assembly is configured to transfer objects from the surface into the receptacle by mechanical action on the objects in response to rotation of the sweep assembly.

20 Claims, 4 Drawing Sheets

(56) References Cited

U.S. PATENT DOCUMENTS

| | | |
|---|---|---|
| 2017/0292329 A1 | 10/2017 | Hayik |
| 2017/0296021 A1 | 10/2017 | Li et al. |
| 2018/0035606 A1 | 2/2018 | Burdoucci |
| 2018/0078106 A1* | 3/2018 | Scholten ............... A47L 9/1683 |
| 2018/0289228 A1* | 10/2018 | Xue ........................ G05D 1/02 |
| 2019/0003137 A1 | 1/2019 | Gao et al. |

* cited by examiner

OBJECT-GATHERING APPARATUS

FIELD

The field of the disclosure relates generally to gathering objects from a surface and, more particularly, to a self-propelled, autonomous apparatus for gathering a selected category of objects from a surface within a bounded operational area.

BACKGROUND

There are many known environments in which it is desirable to gather or collect a certain category of objects distributed on a surface, such as on the ground or an indoor floor surface. At least some known systems apply negative pressure or suction to gather such objects from a surface. However, such systems are inefficient in cases in which the desired category of objects is interspersed with other material that is not desired to be collected ("debris"), and/or the surface is of a type that interferes with, or would be undesirably altered or damaged by, vacuum-based collection of the objects. In addition, at least some known systems apply water jets to scour the objects from the surface, and collect the objects with a cylindrical brush. Again, such systems are inefficient in cases in which the desired category of objects is interspersed with unwanted debris, and/or the surface is of a type that would be undesirably altered or damaged by water-jet-based collection of the objects.

One non-limiting example of such an environment is an indoor and/or outdoor shooting competition field, in which shooting targets and various obstacles are arranged on a natural surface. Throughout the course of a competition or practice round on the field, brass ammunition casings are ejected onto the ground across the field. It is desirable to collect these brass casings, which can be reused to re-manufacture ammunition or otherwise recycled. However, the casings may become entangled in grass or other debris and/or partially embedded in the ground. Known systems are ineffective at gathering the casings with minimal intermixing of dirt, grass, or other debris, while leaving the surface in use-ready condition.

Accordingly, an apparatus that enables selective collection of a desired category of objects from a surface, with reduced impact to the surface, would find utility.

SUMMARY

In one aspect, a self-propelled object-gathering apparatus is provided. The apparatus includes a chassis, a drive system coupled to the chassis and configured to traverse the apparatus over a surface, and a control system coupled to the chassis. The control system is programmed to detect a bounded operational area, and to guide the apparatus within the bounded operational area. The apparatus also includes a receptacle coupled to the chassis, and a sweep assembly coupled to the chassis and rotatable with respect to the chassis. The sweep assembly is configured to transfer objects from the surface into the receptacle by mechanical action on the objects in response to rotation of the sweep assembly.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

The examples described herein include a self-propelled object-gathering apparatus configured to traverse a surface and collect a category of objects. The examples include a rotating sweep assembly configured to transfer the objects from the surface into a receptacle by applying mechanical force to the objects. The examples also include an on-board control system programmed to detect a bounded operational area and to guide the apparatus within the bounded operational area. For example, the guidance system recognizes a perimeter of the operational area using one or more of Global Positioning System (GPS) signals, a beacon signal emanating from the center of the operational area, and radio frequency (RF) markers positioned along a boundary of the operational area. The control system employs any suitable surface-coverage algorithm to cause the apparatus to sweep substantially all navigable portions of the surface within the bounded operational area.

In certain examples, a bottom wall of the collection receptacle includes openings sized to retain the objects of interest, while allowing smaller-sized debris to pass through back to the surface, or to a secondary debris receptacle positioned beneath the collection receptacle. In some such examples, the collection receptacle is coupled to a vibration element that causes the bottom wall to sift the debris from the objects of interest. Additionally or alternatively, the apparatus includes a tiller assembly configured to dislodge objects from, for example, a turf surface and/or guide the objects on the surface into a path of the sweep assembly.

Moreover, in some examples, a drive system of the apparatus includes sets of wheels on each side of the apparatus, and each set has an independent suspension, enabling the apparatus to traverse over obstacles (e.g., landscape elements, man-made obstacles, or relatively larger debris) while maintaining the sweep assembly in operational proximity to the surface to collect the objects of interest. Additionally or alternatively, the apparatus includes a sensor configured to detect impassable obstacles (e.g., fences or walls) located within the bounded operational area, and the control system is programmed to navigate around detected obstacles. In some such examples, the apparatus includes actuators configured to raise the sweep assembly and/or the tiller assembly while, for example, the apparatus is navigating around obstacles or returning to a home base after sweeping operations are completed.

Figure 1:
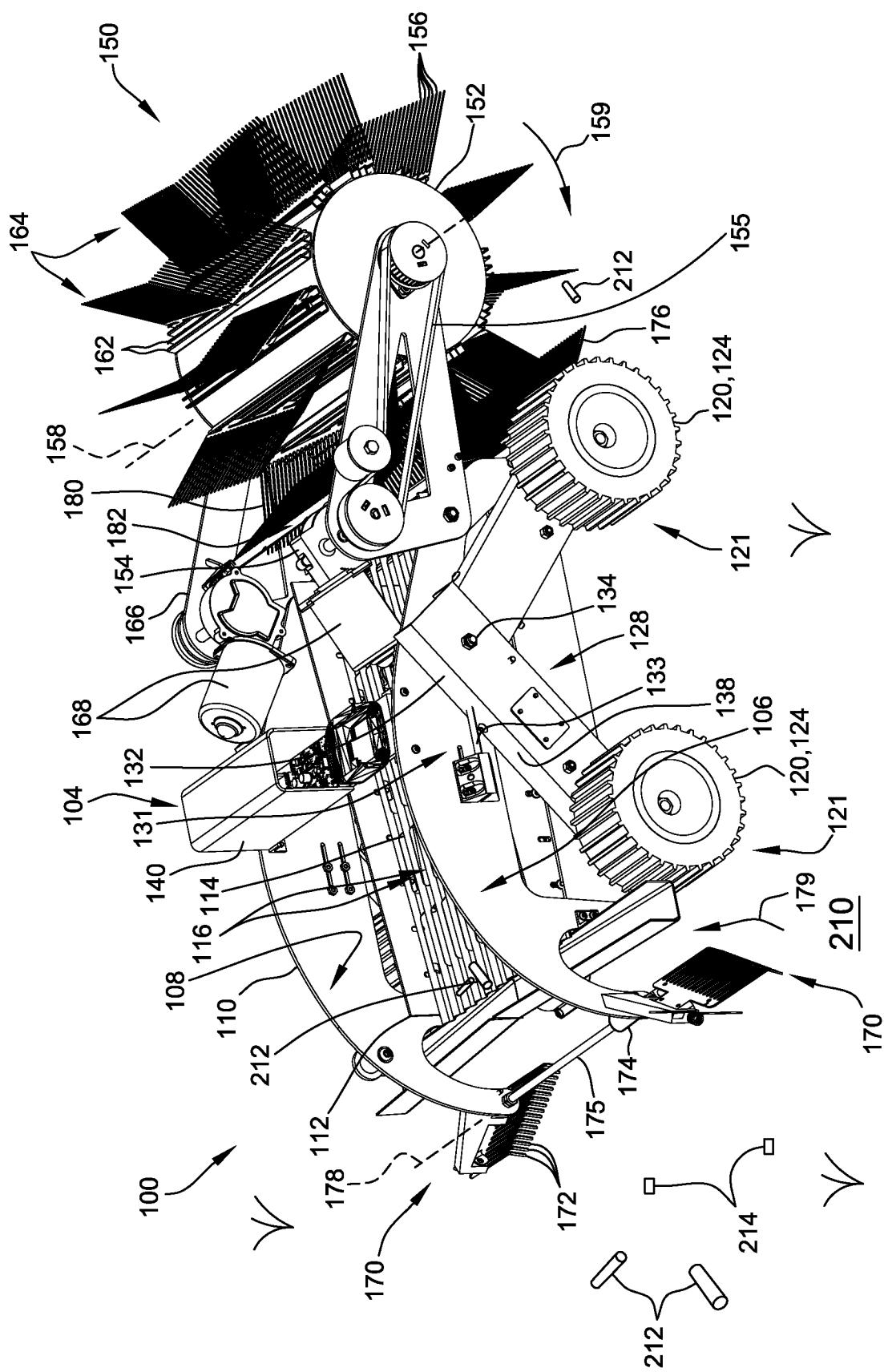
FIG. 1 is a perspective view of an example embodiment of a self-propelled object-gathering apparatus on a surface.
Figure 2:
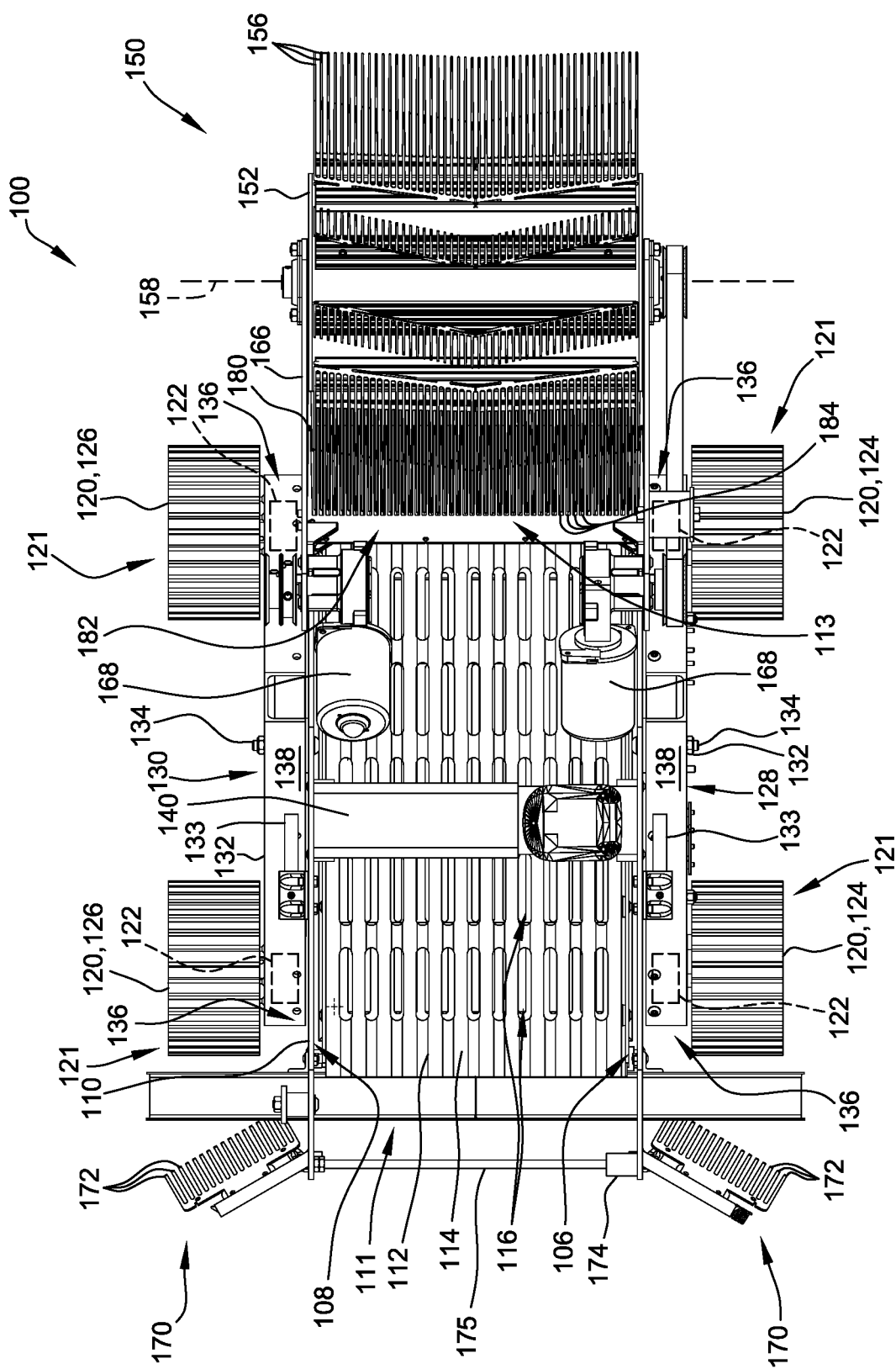
FIG. 2 is a top view of the apparatus of FIG. 1.
Figure 3:
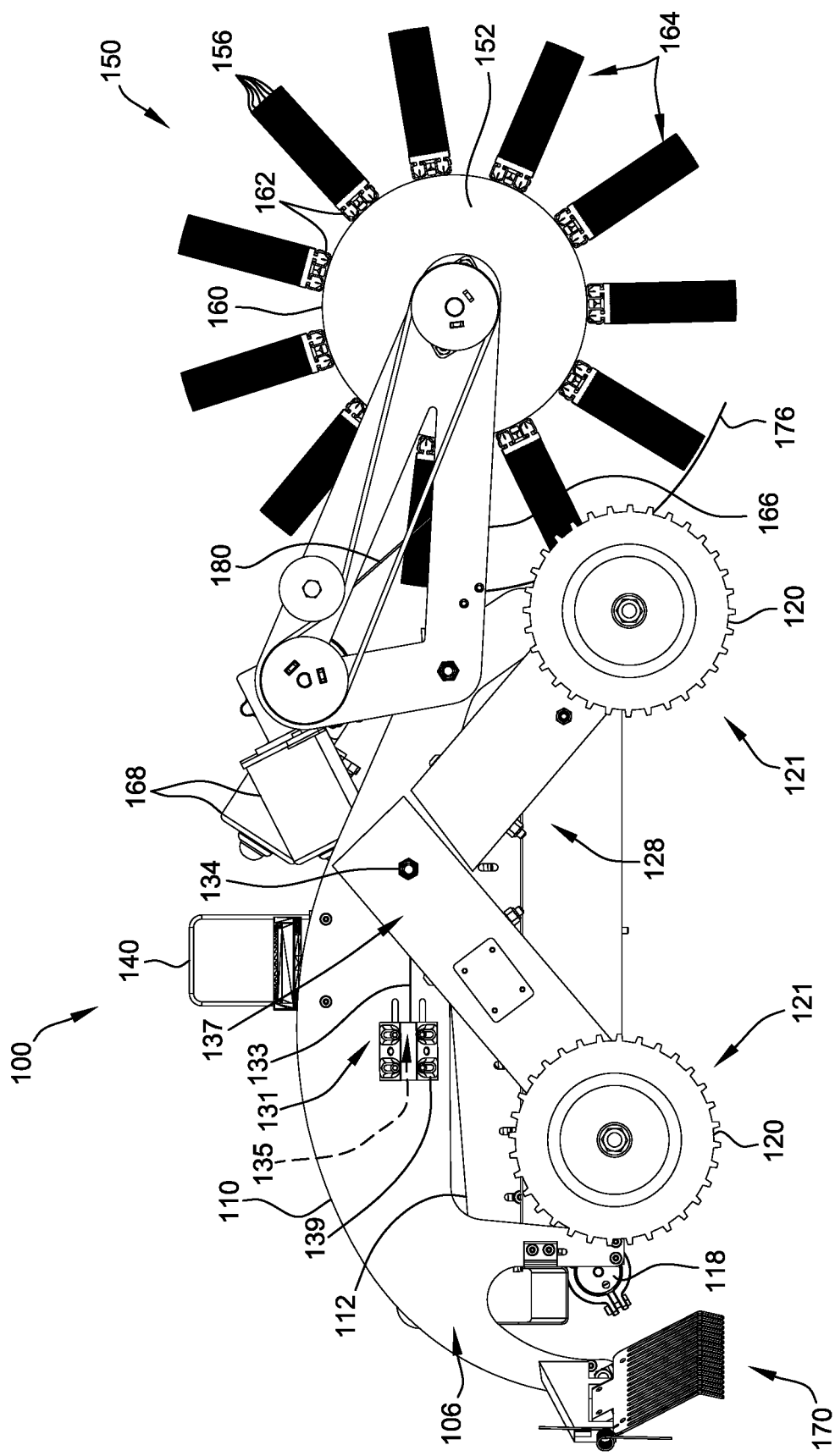
FIG. 3 is a side view of the apparatus of FIG. 1.
Figure 4:
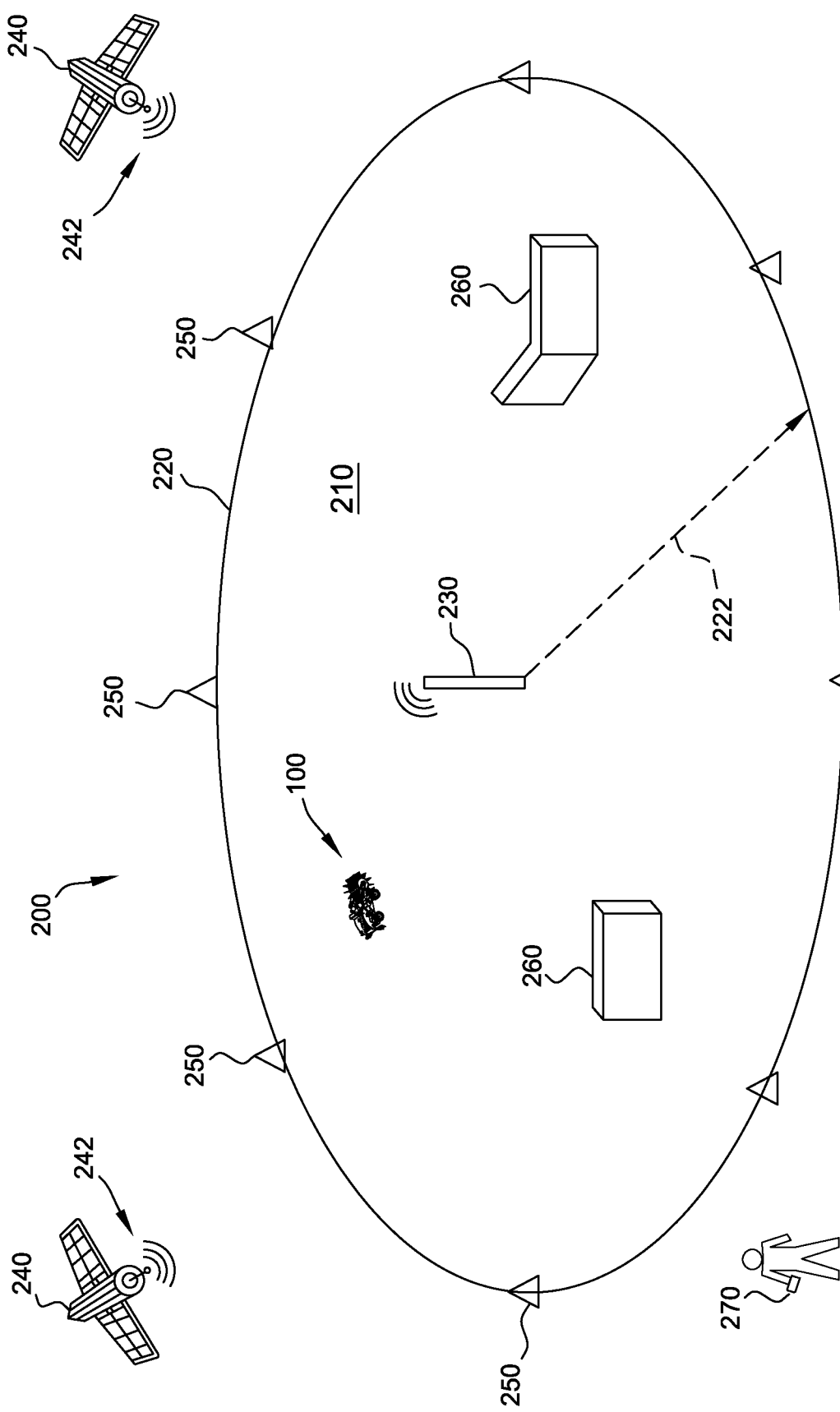
FIG. 4 is a perspective view of the apparatus of FIG. 1 operating in an example environment.

FIG. 1 is a perspective view of an example embodiment of a self-propelled object-gathering apparatus 100 on a surface 210. FIG. 2 is a top view, and FIG. 3 is a side view, of apparatus 100. FIG. 4 is a perspective view of apparatus 100 operating in an example environment 200 that includes surface 210. With reference to FIGS. 1-4, apparatus 100 is configured to operate autonomously in environment 200 and collect a category of objects 212 from surface 210. In the example discussed herein, objects 212 are brass ammunition casings. Alternatively, however, objects 212 are of any type suitable for collection by apparatus 100 as described herein. Also in the example, surface 210 is a natural turf surface, and environment 200 is an outdoor shooting competition field. Alternatively, surface 210 is any type of surface, and/or environment 200 is any type of environment, suitable for operation of apparatus 100 as described herein.

In the illustrated example, apparatus 100 includes a chassis 110. For example, chassis 110 is a rigid frame that provides structural support for the other elements of apparatus 100. Chassis 110 may be formed from a metallic or hard plastic material, for example.

Apparatus 100 further includes a control system 140 coupled to chassis 110. In the illustrated example, control system 140 is housed on a bridge portion 104 of chassis 110 that extends between opposing first and second sides 106, 108 of chassis 110. Alternatively, control system 140 is coupled to chassis 110 in any suitable fashion that enables apparatus 100 to function as described herein. Control system 140 is programmed to detect a bounded operational area 220 within environment 200, and to guide apparatus 100 within bounded operational area 220. In some examples, control system 140 employs a suitable surface-coverage algorithm to cause apparatus 100 to sweep substantially all navigable portions of surface 210 within bounded operational area 220. Such surface-coverage algorithms are known in the art, and need not be described here.

Apparatus 100 further includes a drive system 121 coupled to chassis 110 and configured to traverse apparatus 100 over surface 210. In the illustrated example, drive system 121 comprises a plurality of wheels 120. Alternatively, drive system 121 includes any suitable mechanism that enables apparatus 100 to traverse surface 210, such as at least one caterpillar track. In the illustrated example, the plurality of wheels 120 includes four wheels 120. Alternatively, the plurality of wheels 120 includes any suitable number of wheels 120 that enables apparatus 100 to function as described herein.

In some examples, drive system 121 includes at least one wheel motor 122 coupled to the chassis and drivingly coupled to at least one of the plurality of wheels 120. More specifically, in some examples, the at least one wheel motor 122 is in communication with control system 140, and control system 140 is programmed to selectively operate the at least one wheel motor 122 to traverse apparatus 100 over surface 210 within bounded operational area 220. For example, control system 140 is programmed to detect a current position of apparatus 100 with respect to bounded operational area 220, as described in more detail below, and to selectively drive the at least one wheel motor 122 in accordance with the current position of apparatus 100 and the surface-coverage algorithm.

In the illustrated example, as best seen in FIG. 2, the at least one wheel motor 122 includes a respective wheel motor 122 drivingly coupled to each wheel 120. In other words, in the illustrated example, every wheel 120 is powered by a separate respective wheel motor 122, and each wheel motor 122 is separately controlled by control system 140. In some cases, the use of a separately controlled wheel motor 122 for each wheel 120 enhances a maneuverability of apparatus 100. For example, changing a forward direction of travel of apparatus 100 is accomplished by driving wheel motors 122 on opposing sides 106, 108 of chassis 110 in opposite rotational directions. This arrangement avoids a need for a steering system to change the orientation of the axis of rotation of the wheels 120 relative to the chassis. Alternatively, the at least one wheel motor 122 includes fewer wheel motors 122 than the number of wheels 120. For example, only the two front wheels 120 are coupled to respective wheel motors 122. For another example, a single wheel motor 122 is used to drive multiple wheels 120.

In some examples, drive system 121 includes a first set 124 of wheels 120 positioned adjacent to first side 106 of chassis 110, and a second set 126 of wheels 120 positioned adjacent to second side 108 of chassis 110, and apparatus 100 further includes a first suspension assembly 128 coupling the first set 124 to chassis 110 and a second suspension assembly 130 coupling the second set 126 to chassis 110. More specifically, first and second suspension assemblies 128, 130 are independent, enabling apparatus 100 to traverse over obstacles while maintaining sweep assembly 150 (described in more detail below) in operational proximity to surface 210 to collect objects 212. For example, if one rear wheel 120 is elevated by a rock or hump of turf protruding from surface 210, the independent suspensions allow sweep assembly 150 to remain substantially in operational position to collect objects 212.

In the illustrated example, first suspension assembly 128 includes a rocker arm 132 that includes a pivot 134 and two ends 136. More specifically, rocker arm 132 extends in an inverted V-shape from pivot 134, at the point of the V-shape, to the two ends 136. Pivot 134 is coupled to first side 106 of chassis 110, and a respective wheel 120 of first set 124 is coupled to each of the two ends 136. Rocker arm 132 is substantially rigid and rotatable about pivot 134 within a plane defined by the V-shape, such that upward movement of either wheel 120 in first set 124 results in relative downward movement in the other wheel 120 of first set 124. In some examples, implementation of first suspension assembly 128 using rocker arm 132 enables apparatus 100 to traverse over obstacles while maintaining sweep assembly 150 in operational proximity to surface 210 to collect objects 212. Alternatively, first suspension assembly 128 is configured in any suitable fashion that enables apparatus 100 to function as described herein.

In some examples, first suspension assembly 128 further includes a biasing element 131 coupled between chassis 110 and rocker arm 132. Biasing element 131 is configured to return first set 124 of wheels 120 to a common horizontal plane, for example after traversal of a small obstacle has displaced rocker arm 132 about pivot 134. In some examples, biasing element 131 facilitates smoother operation of sweep assembly 150 by damping excessive movement of rocker arm 132.

In the illustrated example, rocker arm 132 includes an upper surface 138 extending between pivot 134 and a first of the two ends 136. In addition, as best seen in FIG. 3, biasing element 131 includes a resilient strip 133 that includes a first end 135 fixed to first side 106 of chassis 110, and an opposite, free second end 137 configured to urge upper surface 138 downward in response to upward displacement of the first end 136 of the rocker arm. For example, resilient strip 133 is a flat strip of metal that resiliently flexes in response to upward movement of upper surface 138. Alternatively, biasing element 131 is implemented in any suitable fashion that enables first suspension assembly 128 to function as described herein.

In some examples, first suspension assembly 128 further includes an adjustable mount 139 fixed to first side 106 of chassis 110. Adjustable mount 139 is operable to affix first end 135 of resilient strip 133 at any of a plurality of positions relative to pivot 134. For example, adjustable mount 139 is implemented as a clamp configured to sandwich first end 135 therein. Affixing first end 135 closer to a front end 111 of chassis 110 results in relatively less spring force applied to upper surface 138 by free second end 137, while affixing first end 135 closer to a rear end 113 of chassis 110 results in relatively more spring force applied to upper surface 138 by free second end 137. Accordingly, adjustable mount 139 enables easy adjustment of a return force applied by biasing element 131. Alternatively, resilient strip 133 is mounted to chassis 110 in any suitable fashion that enables apparatus 100 to function as described herein.

Apparatus 100 also includes a receptacle 112 coupled to chassis 110, and a sweep assembly 150 coupled to chassis 110 and rotatable with respect to chassis 110. Sweep assembly 150 is configured to transfer objects 212 from surface 210 into receptacle 112 by mechanical action on the objects in response to rotation of sweep assembly 150. In some examples, the ability of apparatus 100 to collect and deposit objects 212 in receptacle 112 via solely mechanical action on objects 212, without use of negative pressure or vacuum suction or water jets to move the objects as in conventional systems, avoids alteration or damage to surface 210 and leaves surface 210 in a use-ready condition.

In the illustrated example, sweep assembly 150 is located adjacent to rear end 113 of chassis 110. Alternatively, sweep assembly 150 is located at any suitable location with respect to chassis 110 that enables apparatus 100 to function as described herein.

In some examples, sweep assembly 150 includes a roller element 152 coupled to chassis 110 and rotatable with respect to chassis 110, a sweep assembly motor 154 coupled to chassis 110 and drivingly coupled to roller element 152 to cause rotation of roller element 152, and bristles 156 extending outward from roller element 152 and configured to urge objects 212 from surface 210 into receptacle 112 via direct mechanical contact in response to the rotation of roller element 152. Alternatively, sweep assembly 150 is implemented in any suitable fashion that enables apparatus 100 to function as described herein.

In some examples, roller element 152 is rotatable about an axis 158 generally parallel to surface 210 and extending generally perpendicular to first and second sides 106, 108 of chassis 110. For example, roller element 152 has a cylindrical shape, and a longitudinal axis of the cylinder defines axis 158. Roller element 152 rotates about axis 158 in a direction 159 that causes bristles 156 underneath roller element 152 to contact, or nearly contact, surface 210 and sweep objects 212 lying thereon towards receptacle 112. Alternatively, axis 158 has any suitable orientation, and/or roller element 152 has any suitable shape, that enables apparatus 100 to function as described herein.

In some examples, bristles 156 are arranged on roller element 152 in circumferentially spaced rows 164. For example, in the illustrated embodiment, the rows 164 have a V-shape oriented to scoop objects 212 towards receptacle 112, and then allow objects 212 to tumble out under the force of gravity as each row 164 elevates above receptacle 112. Moreover, in some examples, sweep assembly 150 further includes tracks 162 defined on, or coupled to, a circumferential outer surface 160 of the roller element, and bristles 156 are affixed to tracks 162. In particular, replacement of worn bristles 156 is accomplished by sliding the worn bristles 156 laterally out of the corresponding tracks 162, and sliding new bristles 156 into the tracks. Alternatively, bristles 156 are coupled to roller element 152 in any suitable fashion and spacing that enables apparatus 100 to function as described herein Bristles 156 may be selected to have a flexibility that avoids significant scraping damage to surface 210, while being sufficiently stiff to capture the desired category of objects 212 during rotation of roller element 152. In some examples, bristles 156 having different flexibility are selected for different combinations of surface 210 and objects 212. In other words, bristles 156 having a first flexibility tailored for collecting relatively smaller brass ammunition casings from a natural turf surface may be swapped out for bristles 156 having a second flexibility tailored for collecting relatively larger brass ammunition casings from an artificial surface. As described above, tracks 162 are used in some examples to facilitate swapping out of bristles 156 adapted for different use conditions.

In some examples, apparatus 100 is configured to raise sweep assembly 150 away from surface 210 during certain operating conditions when collection of objects 212 is unnecessary, such as transit to or from a docking station (not shown) or while navigating around obstacles 260. In some cases, raising sweep assembly 150 reduces drag or interference that may be caused by sweep assembly 150 during non-collecting operations. In the illustrated example, apparatus 100 includes a rigid linkage 166 that couples roller element 152 to chassis 110; and at least one linkage actuator 168 coupled between linkage 166 and chassis 110. Linkage actuator 168 is in communication with control system 140, which is further programmed to selectively operate linkage actuator 168 to elevate roller element 152, and hence elevate bristles 156 away from surface 210, for example in response to control system 140 commanding transit to or from a docking station or detecting and navigating around an obstacle 260. Likewise, control system 140 is further programmed to lower roller element 152, and hence deploy bristles 156 into contact or near-contact with surface 210, when the non-collecting mode of operations has ended. Alternatively, apparatus 100 is configured to selectively raise and lower sweep assembly 150 in any suitable fashion.

In some examples, sweep assembly motor 154 is coupled to chassis 110 indirectly via linkage 166. In the illustrated example, sweep assembly motor 154 is mounted on linkage 166. Alternatively, sweep assembly motor 154 is mounted in any suitable location that enables sweep assembly 150 to function as described herein. In certain examples, sweep assembly motor 154 is configured to convert electrical energy (e.g., from an on-board battery) into mechanical action on objects 212 via rotation of roller element 152. In the illustrated example, sweep assembly motor 154 is configured to rotate roller element 152 via a drive belt 155. Alternatively, sweep assembly motor 154 is configured to convert electrical energy into mechanical action on objects 212 in any suitable fashion that enables apparatus 100 to function as described herein. As noted above, in some examples, the use of solely electro-mechanical systems to collect objects 212, without use of negative pressure or vacuum suction or water jets to move the objects as in conventional systems, avoids alteration or damage to surface 210 and leaves surface 210 in a use-ready condition.

In some examples, apparatus 100 further includes a ramp 176 coupled to chassis 110 between sweep assembly 150 and receptacle 112. Ramp 176 is configured to cooperate with bristles 156 to guide objects 212 into receptacle. 112. In the illustrated example, ramp 176 extends from rear end 113 of chassis 110, rearwards and downwards into contact, or near-contact, with surface 210. As apparatus 100 moves forward, ramp 176 is configured to flex in a rearward direction to allow objects 212 on surface 210 to pass underneath ramp 176 and into a position for collection by sweep assembly 150.

In the illustrated example, ramp 176 has an arcuate profile complementary to a path traveled by the tips of bristles 156 as bristles 156 rotate upwards from underneath roller element 152 towards chassis 110. Thus, ramp 176 cooperates with bristles 156 to retain collected objects 212 until they are in position for dropping into receptacle 112. Moreover, the arcuate profile enables ramp 176 to trail along surface 210 in a fashion that reduces interference with surface 210 and displacement of objects 212 from the path of sweep assembly 150. Alternatively, ramp 176 has any suitable configuration that enables apparatus 100 to function as described herein.

In some examples, apparatus 100 further includes a screen 180 coupled to chassis 110. Screen 180 extends from a first end 182 elevated above receptacle 112 and rearward towards roller element 152. More specifically, screen 180 is oriented to deflect objects 212 elevated by bristles 156 towards receptacle 112. In other words, screen 180 captures objects 212 that may be "popped" away from surface 210 by bristles 156, and facilitates clearing any objects 212 that may not have fallen from bristles 156 into receptacle 112 under the force of gravity alone.

In the illustrated example, screen 180 comprises screen bristles 184 that are interdigitated with bristles 156 of sweep assembly 150. Bristles 156 of sweep assembly 150 pass between stationary screen bristles 184 during rotation of sweep assembly 150. Interdigitated screen bristles 184 facilitate clearing of objects 212 from bristles 156. Alternatively, screen 180 has any suitable configuration that enables sweep assembly 150 to function as described herein.

In some examples, receptacle 112 includes a bottom wall 114 that includes openings 116 extending therethrough. More specifically, openings 116 are sized to prevent passage of objects 212 therethrough, and permit passage of debris 214 that has a size smaller than a size of the objects 214 therethrough. Debris 214 generally includes any material on surface 210, other than the desired category of objects 212, that may be captured and deposited into receptacle 112 by sweep assembly 150. Debris 214 may include, for example but without limitation, dirt particles from a natural turf surface or fibers from an artificial surface. Openings 116 configured to enable separation of debris 214 from collected objects 212 facilitates more efficient collection and, in some cases, more efficient re-use or recycling of objects 212. Alternatively, receptacle 112 does not include openings 116 in bottom wall 114.

In some examples, apparatus 100 is configured to allow debris 214 passed through openings 116 to fall directly back to surface 210. In other examples, apparatus 100 includes a secondary receptacle (not shown) directly beneath openings 116 to capture debris 214 passed through openings 116 for subsequent disposal.

In the illustrated example, openings 116 have a slotted shape with a width slightly less than a characteristic dimension of the desired category of objects 212 (e.g., a width of ammunition casings sought to be collected). Alternatively, openings 116 have any suitable shape that enables receptacle 112 to function as described herein.

In some examples, apparatus 100 further includes a vibration element 118 coupled between chassis 110 and receptacle 112. More specifically, bottom wall 114 is configured to sift debris 214 from objects 212 and through openings 116 in response to operation of vibration element 118. In the illustrated example, vibration element 118 is coupled between front end 111 of chassis 110 and bottom wall 114. Alternatively, vibration element 118 is coupled at any suitable location that enables receptacle 112 to function as described herein.

In some examples, vibration element 118 is in communication with control system 140, which is further programmed to selectively operate vibration element 118 during collection operations, and to selectively deactivate vibration element 118 during non-collection operations, such as when apparatus 100 is in transit to or from a docking station or navigating around an obstacle. Alternatively, vibration element 118 is not selectively operable.

In some examples, receptacle 112 is removable from, and re-installable into, apparatus 100 by hand for ease of emptying collected objects 212. For example, receptacle 112 is receivable into chassis 110 in a snap fit, or is locked into place with a hand-operated latch (not shown). Alternatively, receptacle 112 is not removable from and re-installable into apparatus 100 by hand.

In some examples, bottom wall 114 is sloped downward in a direction away from sweep assembly 150. The downward slope tends to cause collected objects 212 to migrate away from a portion of receptacle 112 adjacent to sweep assembly 150, clearing space for additional objects 212 to be deposited from sweep assembly 150 into that portion of receptacle 112. In the illustrated example, sweep assembly 150 is located at rear end 113 of chassis 110, and bottom wall 114 slopes downward towards front end 111 of chassis 110, causing objects 212 to migrate toward front end 111 and clearing space for additional objects 212 to be deposited near rear end 113. Alternatively, bottom wall 114 has any suitable orientation that enables receptacle 112 to function as described herein.

In some examples, apparatus 100 further includes a tiller assembly 170 configured to guide objects 212 on surface 210 into a path of sweep assembly 150 in response to forward motion of apparatus 100. In some cases, tiller assembly 170 increases an efficiency of collection of objects 212 by moving additional objects 212 into a path of sweep assembly 150, and/or by dislodging objects 212 that have become partially embedded in surface 210. For example, in cases where surface 210 is natural turf, objects 212 may become entangled in grass or embedded in dirt after being stepped on.

In some examples, tiller assembly 170 includes a plurality of tines 172 configured to abut surface 210 and oriented to urge objects 212 into the path of sweep assembly 150. In the illustrated example, tines 172 are positioned at front end 111 of chassis 110 in two sets, with each set in front of a path of wheels 120 (with respect to forward motion of apparatus 100) on a respective side 106, 108 of chassis 110. Each set of tines 172 is oriented obliquely inward and rearward to funnel objects 212 underneath chassis 110 and into the path of sweep assembly 150. Thus, in the illustrated example, tines 172 increase an effective collection width of apparatus 100 and facilitate preventing objects 212 from being run over by wheels 120 and consequently embedded in surface 210. Alternatively, tines 172 are positioned and oriented in any suitable fashion that enables apparatus 100 to function as described herein.

In some examples, apparatus 100 is configured to raise tiller assembly 170 away from surface 210 during certain operating conditions when collection of objects 212 is unnecessary, such as transit to or from a docking station (not shown) or while navigating around obstacles 260. In some cases, raising tiller assembly 170 reduces drag or interference that may be caused by tiller assembly 170 during non-collecting operations. In some such examples, tiller assembly 170 further includes a tiller actuator 174 coupled between chassis 110 and plurality of tines 172. Tiller actuator 174 is in communication with control system 140, which is further programmed to selectively operate tiller actuator 174 to retract tines 172 away from surface 210, for example in response to control system 140 commanding transit to or from a docking station or detecting and navigating around an obstacle 260. Likewise, control system 140 is further programmed to deploy tines 172 into abutment with surface 210 when the non-collecting mode of operations has ended.

In the illustrated example, tiller assembly 170 further includes a connecting rod 175 coupled to chassis 110, and the two sets of tines 172 as discussed above are mounted on opposite ends of connecting rod 175. Tiller actuator 174 is fixed to chassis 110 and operable to rotate connecting rod 175 such that tines 172 rotate rearward and upward, as shown by arrow 179 in FIG. 1, to implement retraction of tines 172 away from surface 210. Tiller actuator 174 is likewise operable to rotate connecting rod 175 such that tines 172 rotate forward and downward, opposite to arrow 179, to implement deployment of tines 172 into abutment with surface 210. Alternatively, apparatus 100 is configured to selectively raise and lower tiller assembly 170 in any suitable fashion.

In some examples, apparatus 100 further includes a suitable cover, which is not shown in FIGS. 1-4 for ease of illustration of the features of apparatus 100. For example, the cover is coupled to chassis 110 and is configured to extend over receptacle 112 and sweep assembly 150.

With particular reference to FIG. 4, in some examples, control system 140 is programmed to detect bounded operational area 220 with reference to a local beacon 230 configured to emit signals that are wirelessly detectable by control system 140. For example, local beacon 230 may be a low-energy Bluetooth ("Bluetooth LE") device, such that a proximity to local beacon 230 can be calculated from the received beacon signal at a distance of up to approximately 150 feet from local beacon 230, according to protocols established in an iBeacon application programming interface ("API") available through Apple Inc., 1 Infinite Loop Cupertino, Calif. 95014. Alternatively, local beacon 230 is configured to implement any suitable type of wireless beacon signal from which a proximity can be calculated. For example, control system 140 is programmed to detect bounded operational area 220 by storing a value representative of a predetermined radius 222 of bounded operational area 220, wirelessly detecting the proximity to local beacon 230 located within bounded operational area 220, and preventing apparatus 100 from traversing away from local beacon 230 beyond predetermined radius 222.

Additionally or alternatively, in some examples, control system 140 is programmed to detect bounded operational area 220 with reference to GPS signals 242 that are emitted from a plurality of GPS satellites 240 and wirelessly detectable by control system 140. For example, control system 140 is programmed to detect bounded operational area 220 by storing geographical coordinates that define bounded operational area 220, wirelessly detecting GPS signals 242, and preventing apparatus 100 from traversing outside bounded operational area 220 by comparing a geographical location derived from detected GPS signals 242 to the stored geographical coordinates.

Additionally or alternatively, in some examples, control system 140 is programmed to detect bounded operational area 220 with reference to a plurality of radio frequency (RF)-enabled boundary markers 250 located along a perimeter of bounded operational area 220. RF-enabled boundary markers 250 are each configured to emit a short-range RF signal including a unique identifier of the marker. The signal is either actively powered (e.g., by a battery coupled to the marker 250) and periodic, or passively powered by a strobe emitted by an RF module of control system 140. Control system 140 is programmed to detect bounded operational area 220 via short-range wireless interactions with the plurality of RF-enabled boundary markers 250. For example, control system 140 is configured to store a relative location of each RF-enabled boundary marker 250, wirelessly detect a signal from at least one of RF-enabled boundary markers 250, extract the unique identifier of the at least one RF-enabled boundary marker 250, and prevent apparatus 100 from traversing outside bounded operational area 220 based on the stored relative location of the identified at least one RF-enabled boundary marker 250.

Alternatively, control system 140 is programmed to detect bounded operational area 220 in any suitable fashion that enables apparatus 100 to function as described herein.

In some cases, environment 200 includes impassable obstacles 260 (e.g., fences or walls) located within bounded operational area 220. In some examples, control system 140 is programmed to navigate apparatus 100 around detected obstacles 260. For example, control system 140 is programmed to detect obstacles 260 located within bounded operational area 220 based on feedback from at least one ultrasound sensor included in control system 140. Additionally or alternatively, control system 140 is programmed to detect obstacles 260 located within bounded operational area 220 based on feedback from at least contact sensor included in control system 140. Additionally or alternatively, control system 140 is programmed to detect obstacles 260 located within bounded operational area 220 in any suitable fashion that enables apparatus 100 to function as described herein.

In some examples, control system 140 includes additional sensors (not individually shown) configured to monitor a status of various components of apparatus 100. For example, control system 140 includes sensors that monitor one or more of: whether wheels 120 are rotating; whether sweep assembly 150 is rotating; whether roller sweep assembly 150 is elevated or lowered; whether tiller assembly 170 is retracted or deployed; and whether receptacle 112 is full to capacity. Feedback from these sensors is monitored to detect fault conditions, for example, jamming of wheels 120, sweep assembly 150, or vibrating bottom wall 114, or a need to empty receptacle 112 to enable collection of more objects 212.

In some examples, apparatus 100 includes an on-board battery (not shown) that distributes power to all powered elements of the apparatus as described above. In other examples, at least one powered element includes a dedicated battery (not shown) local to the element.

In some examples, control system 140 is programmed to communicate wirelessly with a computer-executable application on a user computing device 270. For example, control system 140 is configured to communicate with the computer application using a Bluetooth connection. The computer application may be used to upload operational parameters to control system 140, such as but not limited to: selection of method for detecting the perimeter of bounded operational area 220; relative locations of RF-enabled boundary markers 250; selection of stored surface-coverage algorithm or upload of new surface coverage algorithm; and scheduling of operational times and/or down times. In addition, the computer application may be used to report operating conditions, statistics, and/or faults detected by control system 140, such but not limited to: current location; log of recent operations; fault status of wheels 120, sweep assembly 150, and vibrating bottom wall 114; raised versus lowered status of sweep assembly 150; deployed versus retracted status of tiller assembly 170; battery charge level; and fill level of receptacle 112.

Examples of a self-propelled object-gathering apparatus are described above in detail. The apparatus is not limited to the specific examples described herein, but rather, components of the apparatus may be used independently and separately from other components and environmental elements described herein. For example, the apparatus described herein may be used in a variety of environments, including and without limitation, natural and artificial surfaces, indoors and outdoors, and with any category of objects having a suitable size for collection and retention by the apparatus.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A self-propelled object-gathering apparatus comprising:
   a chassis;
   a drive system coupled to the chassis and configured to traverse the apparatus over a surface, the drive system comprising a set of wheels:
   a suspension assembly coupling the set of wheels to the chassis, the suspension assembly comprising:
   a rocker arm comprising a pivot and two ends, the rocker arm extending in an inverted V-shape from the pivot to the two ends, wherein the pivot is coupled to the chassis and a respective wheel of the set of wheels is coupled to each of the two ends; and
   a biasing element coupled between the chassis and the rocker arm, the biasing element configured to return the set of wheels to a common horizontal plane;
   a control system coupled to the chassis and programmed to detect a bounded operational area, and to guide the apparatus within the bounded operational area;
   a receptacle coupled to the chassis, wherein the receptacle comprises a bottom wall comprising openings extending therethrough; and
   a sweep assembly coupled to the chassis and rotatable with respect to the chassis, the sweep assembly configured to transfer objects from the surface into the receptacle by mechanical action on the objects in response to rotation of the sweep assembly, wherein the openings are sized to prevent passage of the objects therethrough and permit passage of debris therethrough, the debris having a size smaller than a size of the objects.

2. The self-propelled object-gathering apparatus according to claim 1, wherein the sweep assembly comprises:
   a roller element coupled to the chassis and rotatable with respect to the chassis;
   a sweep assembly motor coupled to the chassis and drivingly coupled to the roller element to cause rotation of the roller element; and
   bristles extending outward from the roller element and configured to mechanically urge the objects from the surface into the receptacle in response to the rotation of the roller element.

3. The self-propelled object-gathering apparatus according to claim 2, wherein the roller element comprises a circumferential outer surface and tracks defined on, or coupled to, the circumferential outer surface, and wherein the bristles are affixed to the tracks.

4. The self-propelled object-gathering apparatus according to claim 2, wherein the bristles are arranged on the roller element in circumferentially spaced rows, and wherein at least one of the rows comprises a V-shape oriented to scoop the objects towards the receptacle.

5. The self-propelled object-gathering apparatus according to claim 2, further comprising:
   a linkage coupling the roller element to the chassis; and
   a linkage actuator coupled between the linkage and the chassis, the linkage actuator in communication with the control system, wherein the control system is further programmed to selectively operate the linkage actuator to i) elevate the bristles away from the surface and ii) deploy the bristles into contact or near-contact with the surface.

6. The self-propelled object-gathering apparatus according to claim 2, further comprising a ramp coupled to the chassis between the sweep assembly and the receptacle, the ramp configured to cooperate with the bristles to guide the objects into the receptacle.

7. The self-propelled object-gathering apparatus according to claim 6, further comprising a screen coupled to the chassis, the screen comprising a screen first end elevated above the receptacle, the screen extending from the screen first end rearward towards the roller element, the screen oriented to deflect the objects elevated by the bristles towards the receptacle.

8. The self-propelled object-gathering apparatus according to claim 1, further comprising a tiller assembly configured to guide the objects on the surface into a path of the sweep assembly in response to forward motion of the apparatus.

9. The self-propelled object-gathering apparatus according to claim 8, wherein the tiller assembly comprises a plurality of tines configured to abut the surface, the plurality of tines oriented to urge the objects into the path of the sweep assembly.

10. The self-propelled object-gathering apparatus according to claim 1, wherein the control system is further programmed to:
    store a value representative of a predetermined radius of the bounded operational area;
    wirelessly detect a proximity to a local beacon located within the bounded operational area; and
    prevent the apparatus from traversing away from the local beacon beyond the predetermined radius.

11. The self-propelled object-gathering apparatus according to claim 1, wherein the control system is further programmed to:
    store geographical coordinates that define the bounded operational area;

wirelessly detect Global Positioning System (GPS) signals; and prevent the apparatus from traversing outside the bounded operational area by comparing a geographical location derived from the detected GPS signals to the stored geographical coordinates.

12. The self-propelled object-gathering apparatus according to claim 1, wherein the control system is further programmed to detect the bounded operational area via short-range wireless interactions with a plurality of RF-enabled boundary markers located along a perimeter of the bounded operational area.

13. The self-propelled object-gathering apparatus according to claim 1, wherein the control system is further programmed to:

detect obstacles located within the bounded operational area based on feedback from at least one sensor of the control system; and navigate the apparatus around the detected obstacles.

14. A self-propelled object-gathering apparatus comprising:

a chassis;

a drive system coupled to the chassis and configured to traverse the apparatus over a surface;

a control system coupled to the chassis and programmed to detect a bounded operational area, and to guide the apparatus within the bounded operational area;

a receptacle coupled to the chassis;

a sweep assembly coupled to the chassis and rotatable with respect to the chassis, the sweep assembly configured to transfer objects from the surface into the receptacle by mechanical action on the objects in response to rotation of the sweep assembly, wherein the sweep assembly comprises:

a roller element coupled to the chassis and rotatable with respect to the chassis;

a sweep assembly motor coupled to the chassis and drivingly coupled to the roller element to cause rotation of the roller element; and bristles extending outward from the roller element and configured to mechanically urge the objects from the surface into the receptacle in response to the rotation of the roller element;

a ramp coupled to the chassis between the sweep assembly and the receptacle, the ramp configured to cooperate with the bristles to guide the objects into the receptacle; and a screen coupled to the chassis, the screen comprising a screen first end elevated above the receptacle, the screen extending from the screen first end rearward towards the roller element, the screen oriented to deflect the objects elevated by the bristles towards the receptacle, wherein the screen comprises screen bristles interdigitated with the bristles of the sweep assembly, wherein the bristles of the sweep assembly pass between the screen bristles during rotation of the sweep assembly.

15. The self-propelled object-gathering apparatus according to claim 14, wherein the chassis comprises opposing first and second sides and the drive system comprises a first set of wheels positioned adjacent to the first side and a second set of wheels positioned adjacent to the second side, the apparatus further comprising:

a first suspension assembly coupling the first set of wheels to the chassis; and a second suspension assembly coupling the second set of wheels to the chassis, wherein the first and second suspension assemblies are independent.

16. The self-propelled object-gathering apparatus according to claim 15, wherein the first suspension assembly comprises a rocker arm comprising a pivot and two ends, the rocker arm extending in an inverted V-shape from the pivot to the two ends, wherein the pivot is coupled to the first side of the chassis and a respective wheel of the first set of wheels is coupled to each of the two ends.

17. The self-propelled object-gathering apparatus according to claim 16, wherein the first suspension assembly further comprises a biasing element coupled between the chassis and the rocker arm, the biasing element configured to return the first set of wheels to a common horizontal plane.

18. A self-propelled object-gathering apparatus comprising:

a chassis comprising opposing first and second sides;

a drive system coupled to the chassis and configured to traverse the apparatus over a surface, the drive system comprising a first set of wheels positioned adjacent to the first side and a second set of wheels positioned adjacent to the second side;

a control system coupled to the chassis and programmed to detect a bounded operational area, and to guide the apparatus within the bounded operational area;

a receptacle coupled to the chassis;

a sweep assembly coupled to the chassis and rotatable with respect to the chassis, the sweep assembly configured to transfer objects from the surface into the receptacle by mechanical action on the objects in response to rotation of the sweep assembly;

a first suspension assembly coupling the first set of wheels to the chassis, the first suspension assembly comprising a rocker arm comprising a pivot and two ends, the rocker arm extending in an inverted V-shape from the pivot to the two ends, wherein the pivot is coupled to the first side of the chassis and a respective wheel of the first set of wheels is coupled to each of the two ends, the first suspension assembly further comprising a biasing element coupled between the chassis and the rocker arm, the biasing element configured to return the first set of wheels to a common horizontal plane;

a second suspension assembly coupling the second set of wheels to the chassis, wherein the first and second suspension assemblies are independent, and wherein:

the rocker arm comprises an upper surface extending between the pivot and a first end of the two ends of the rocker arm; and the biasing element comprises a resilient strip comprising a first end fixed to the first side of the chassis and an opposite, free second end, wherein the free second end is configured to urge the upper surface of the rocker arm downward in response to upward displacement of the first end of the rocker arm.

19. The self-propelled object-gathering apparatus according to claim 18, wherein the receptacle comprises a bottom wall comprising openings extending therethrough, the openings sized to prevent passage of the objects therethrough and permit passage of debris therethrough, the debris having a size smaller than a size of the objects.

20. The self-propelled object-gathering apparatus according to claim 19, further comprising a vibration element coupled between the chassis and the receptacle, wherein the bottom wall is configured to sift the debris from the objects in response to operation of the vibration element.

* * * * *